United States Patent
Mao

(10) Patent No.: US 8,869,284 B1
(45) Date of Patent: Oct. 21, 2014

(54) SYSTEMS AND METHODS FOR EVALUATING APPLICATION TRUSTWORTHINESS

(71) Applicant: Jun Mao, Culver City, CA (US)

(72) Inventor: Jun Mao, Culver City, CA (US)

(73) Assignee: Symantec Corporation, Mountain View, CA (US)

( * ) Notice: Subject to any disclaimer, the term of this patent is extended or adjusted under 35 U.S.C. 154(b) by 100 days.

(21) Appl. No.: 13/645,307

(22) Filed: Oct. 4, 2012

(51) Int. Cl.
*G06F 21/00* (2013.01)
*G06F 21/56* (2013.01)
*H04L 29/06* (2006.01)

(52) U.S. Cl.
CPC .......... *G06F 21/563* (2013.01); *H04L 63/1433* (2013.01)
USPC ............................................... 726/24; 726/23

(58) Field of Classification Search
CPC .. G06F 21/563; G06F 21/562; H04L 63/1433
USPC ...................................................... 726/24, 23
See application file for complete search history.

(56) References Cited

U.S. PATENT DOCUMENTS

2013/0097706 A1* 4/2013 Titonis et al. ................... 726/24

OTHER PUBLICATIONS

Zhou, Wu, et al. "Detecting repackaged smartphone applications in third-party android marketplaces." Proceedings of the second ACM conference on Data and Application Security and Privacy. ACM, Feb. 2012.*
Jing, Liu, et al. "Botnet: classification, attacks, detection, tracing, and preventive measures." EURASIP journal on wireless communications and networking 2009.*
Anand Bodke, Systems and Methods for Detecting Malware on Mobile Platforms, U.S. Appl. No. 13/282,709, filed Oct. 27, 2011.
Yi Li et al., Systems and Methods for Detecting Malware Variants, U.S. Appl. No. 13/297,244, filed Nov. 15, 2011.
Jun Mao, Systems and Methods for Detecting Illegitimate Applications; U.S. Appl. No. 13/604,422, filed Sep. 5, 2012.

* cited by examiner

*Primary Examiner* — Kambiz Zand
*Assistant Examiner* — Michael Guirguis
(74) *Attorney, Agent, or Firm* — ALG Intellectual Property, LLC

(57) ABSTRACT

A computer-implemented method for evaluating application trustworthiness may include 1) identify an application subject to a security assessment, 2) identify a secondary identifier used by the application to identify the application to a third-party service to which the application is configured to send a request during execution, 3) query a secondary identity database with the secondary identifier for information about the secondary identifier, and 4) determine whether the application is malicious based at least in part on the information about the secondary identifier. Various other methods, systems, and computer-readable media are also disclosed.

20 Claims, 7 Drawing Sheets

SYSTEMS AND METHODS FOR EVALUATING APPLICATION TRUSTWORTHINESS

BACKGROUND

With the rise of mobile computing, consumers may now access the Internet from anywhere. Mobile computing devices such as cellular telephones, tablet computers, e-book readers, and the like have become a ubiquitous part of everyday life. However, the ability to access the Internet from these devices also brings the various dangers of the Internet to these devices. Untrusted sources for mobile applications may offer malicious applications for download. Furthermore, trusted sources, such as digital distribution platforms (or "application stores") for some mobile platforms may sometimes inadvertently host malware. Additionally, malicious web pages may exploit vulnerabilities in web browser software that may allow malware to be downloaded to a user's mobile computing device.

Traditional computing security solutions may include installing system-level software, such as anti-virus software, on a computing system to monitor activity on the computing system and block, quarantine, and/or eradicate the variety of threats available through an Internet connection. However, some mobile computing platforms are restricted and/or closed, discouraging and/or preventing users from installing software of their choice and/or from installing system-level software that would provide sufficient access for security software to operate effectively. Furthermore, some anti-malware techniques may be resource intensive, potentially harming the performance of a mobile device. Accordingly, the instant disclosure identifies a need for additional and improved systems and methods for detecting malware on mobile platforms.

SUMMARY

As will be described in greater detail below, the instant disclosure generally relates to systems and methods for evaluating application trustworthiness by using one or more secondary identifiers (e.g., identifiers normally used to identify the application to systems and/or services other than the computing system that installs and/or executes the application) to identify the application and/or one or more characteristics of the application.

In one example, a computer-implemented method for evaluating application trustworthiness may include 1) identifying an application subject to a security assessment, 2) identifying a secondary identifier used by the application to identify the application to a third-party service to which the application is configured to send a request during execution, 3) querying a secondary identity database with the secondary identifier for information about the secondary identifier, and 4) determining whether the application is malicious based at least in part on the information about the secondary identifier.

In some examples, the secondary identifier may include a publisher identifier for an advertisement network and/or an application identifier for a third-party library. In some embodiments, identifying the secondary identifier may include 1) parsing a manifest of the application for the secondary identifier, 2) performing a static analysis of the application to identify the secondary identifier, and/or 3) intercepting a communication from the application to the third-party service to identify the secondary identifier. In one embodiment, identifying the secondary identifier may be in response to checking a digitally-signed primary identifier of the application but failing to recognize the digitally-signed primary identifier of the application as valid.

In some embodiments, determining whether the application is malicious may include 1) determining, based on the information about the secondary identifier, that the secondary identifier has been associated with at least one malicious application and 2) determining, at least in part based on the secondary identifier having been associated with the malicious application, that the application subject to the security assessment also is malicious. Additionally or alternatively, determining whether the application is malicious may include 1) determining that a digitally-signed certificate used as a primary identifier for the application does not match the application, 2) determining, based at least in part on the digitally-signed certificate not matching the application, that the application is a potentially repackaged application, 3) using the secondary identifier to identify an originally packaged and trusted version of the application, and 4) comparing the originally packaged and trusted version of the application with the potentially repackaged application to determine that the application is not malicious.

In one example, the computer-implemented method may also include performing a remediation action on the application in response to determining that the application is malicious. In this example, the computer-implemented method may further include 1) identifying an additional secondary identifier used by the application and 2) submitting the additional secondary identifier to the secondary identity database as being associated with a malicious application in response to determining that the application is malicious and identifying the additional secondary identifier used by the application.

In one embodiment, a system for implementing the above-described method may include 1) an identification module programmed to identify an application subject to a security assessment, 2) an analysis module programmed to identify a secondary identifier used by the application to identify the application to a third-party service to which the application is configured to send a request during execution, 3) a querying module programmed to query a secondary identity database with the secondary identifier for information about the secondary identifier, and 4) a determination module programmed to determine whether the application is malicious based at least in part on the information about the secondary identifier. The system may also include at least one processor configured to execute the identification module, the analysis module, the querying module, and the determination module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to 1) identify an application subject to a security assessment, 2) identify a secondary identifier used by the application to identify the application to a third-party service to which the application is configured to send a request during execution, 3) query a secondary identity database with the secondary identifier for information about the secondary identifier, and 4) determine whether the application is malicious based at least in part on the information about the secondary identifier.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
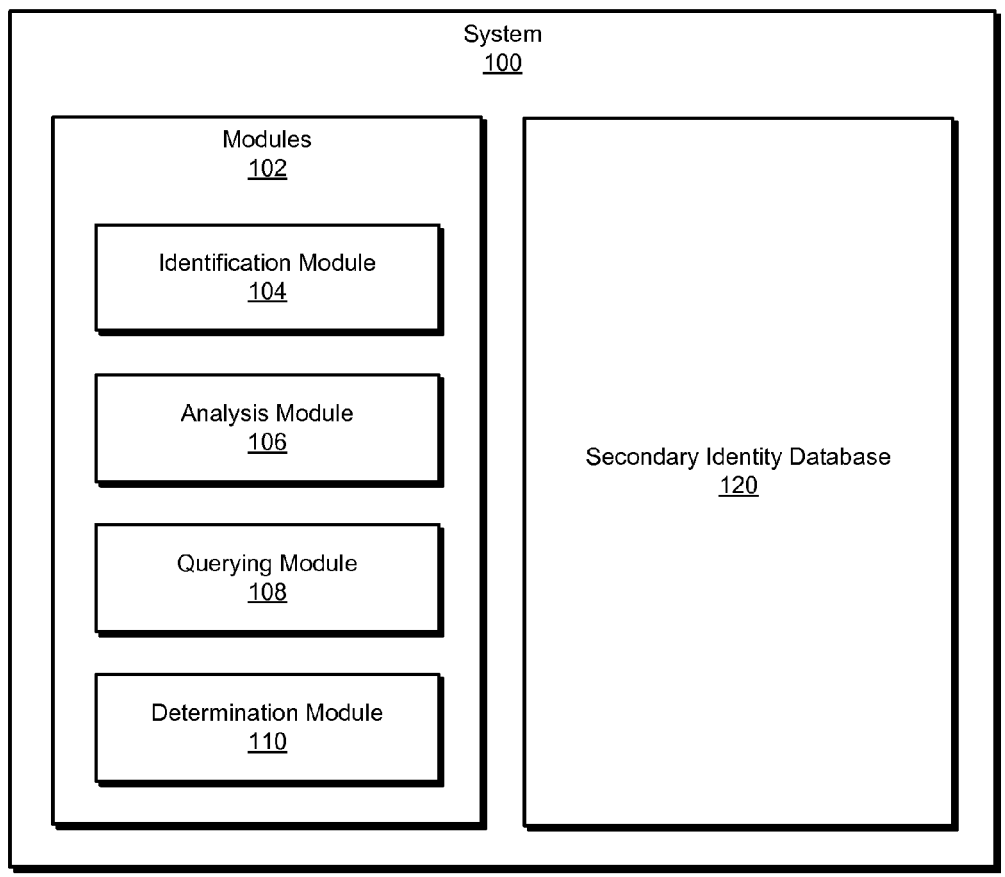
FIG. 1 is a block diagram of an exemplary system for evaluating application trustworthiness.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for evaluating application trustworthiness. As will be explained in greater detail below, by using secondary identifiers to identify applications and/or the maliciousness of applications, the systems and methods described herein may correctly evaluate applications even when primary identifiers (e.g., application package names and/or corresponding digital signatures) fail to validate the applications.

Figure 2:
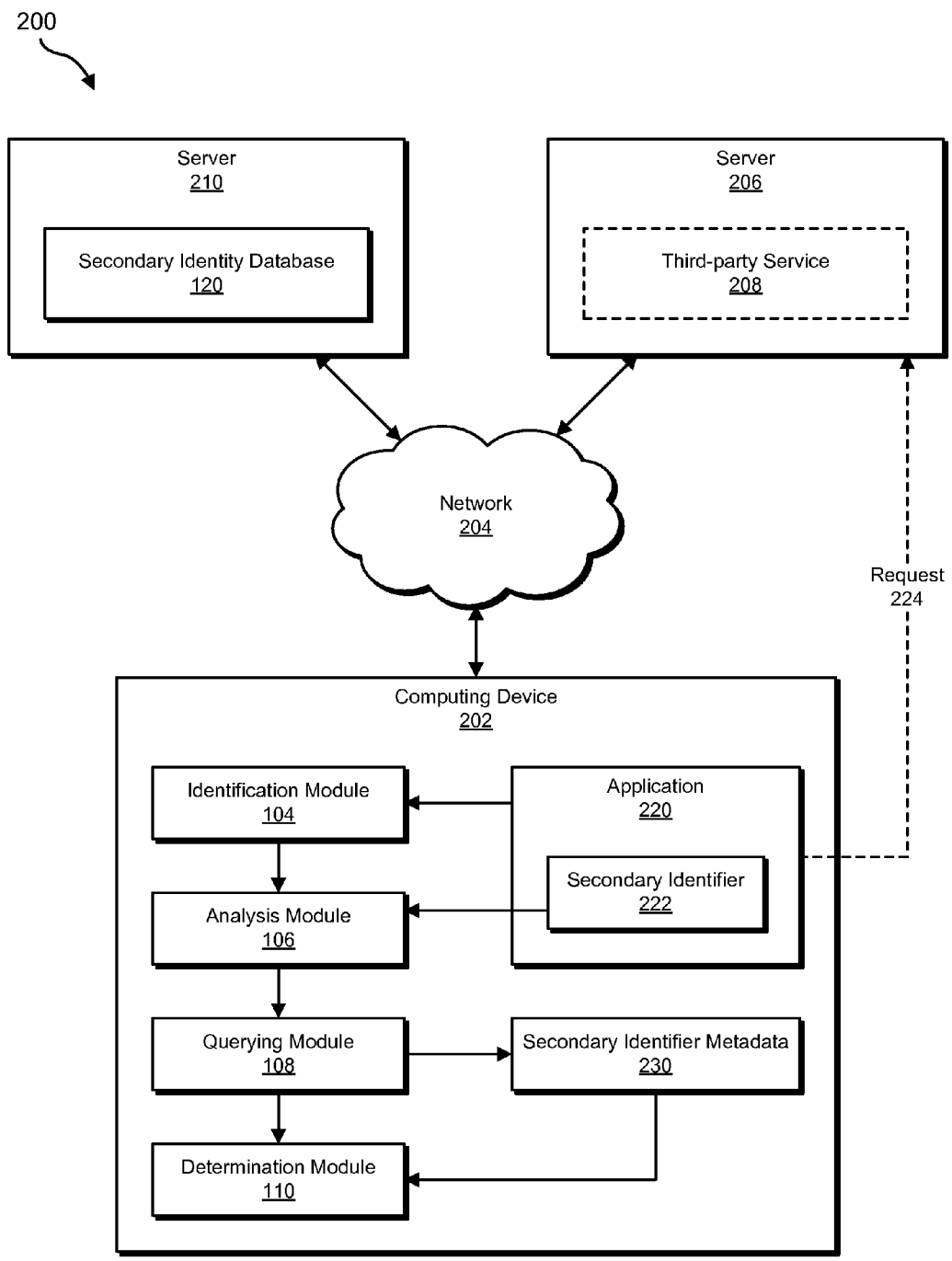
FIG. 2 is a block diagram of an exemplary system for evaluating application trustworthiness.

The following will provide, with reference to FIGS. 1-2, detailed descriptions of exemplary systems for evaluating application trustworthiness. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for evaluating application trustworthiness. As illustrated in this figure, exemplary system 100 may include one or more modules 102 for performing one or more tasks. For example, and as will be explained in greater detail below, exemplary system 100 may include an identification module 104 programmed to identify an application subject to a security assessment. Exemplary system 100 may also include an analysis module 106 programmed to identify a secondary identifier used by the application to identify the application to a third-party service to which the application is configured to send a request during execution.

In addition, and as will be described in greater detail below, exemplary system 100 may include a querying module 108 programmed to query a secondary identity database with the secondary identifier for information about the secondary identifier. Exemplary system 100 may further include a determination module 110 programmed to determine whether the application is malicious based at least in part on the information about the secondary identifier. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202, server 206, and/or server 210), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as secondary identity database 120. In one example, secondary identity database 120 may be configured to store information and/or metadata about one or more secondary identities used by one or more applications (e.g., thereby associating some secondary identities with trustworthiness and/or associating some secondary identities with maliciousness).

Secondary identity database 120 may represent portions of a single database or computing device or a plurality of databases or computing devices. For example, secondary identity database 120 may represent a portion of server 210 in FIG. 2, computing system 610 in FIG. 6, and/or portions of exemplary network architecture 700 in FIG. 7. Alternatively, secondary identity database 120 in FIG. 1 may represent one or more physically separate devices capable of being accessed by a computing device, such as server 206 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 210 (and, in some examples, server 206) via a network 204. Computing device 202 may be programmed with one or more of modules 102 and/or may store all or a portion of the data in database 120. Additionally or alternatively, server 210 may be programmed with one or more of modules 102 and/or may store all or a portion of the data in database 120.

In one embodiment, one or more of modules 102 from FIG. 1 may, when executed by at least one processor of computing device 202 and/or server 210, facilitate computing device 202 and/or server 210 in evaluating application trustworthiness. For example, and as will be described in greater detail below, one or more of modules 102 may cause computing device 202 and/or server 210 to 1) identify an application 220 subject to a security assessment, 2) identify a secondary identifier 222 used by application 220 to identify application 220 to a third-party service 208 to which application 220 is configured to send a request 224 during execution, 3) query secondary identity database 120 with secondary identifier 222 for information about secondary identifier 222 (e.g., secondary identifier metadata 230), and 4) determine whether application 220 is malicious based at least in part on secondary identifier metadata 230 about secondary identifier 222.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 610 in FIG. 6, or any other suitable computing device.

Server 206 generally represents any type or form of computing device that is capable of providing, facilitating, relaying, and/or exposing a service. Examples of server 206 include, without limitation, application servers and database servers configured to provide various database services and/or run certain software applications.

Server 210 generally represents any type or form of computing device that is capable of storing, accessing, and/or handling queries for a database. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202, server 206, and server 210.

Figure 3:
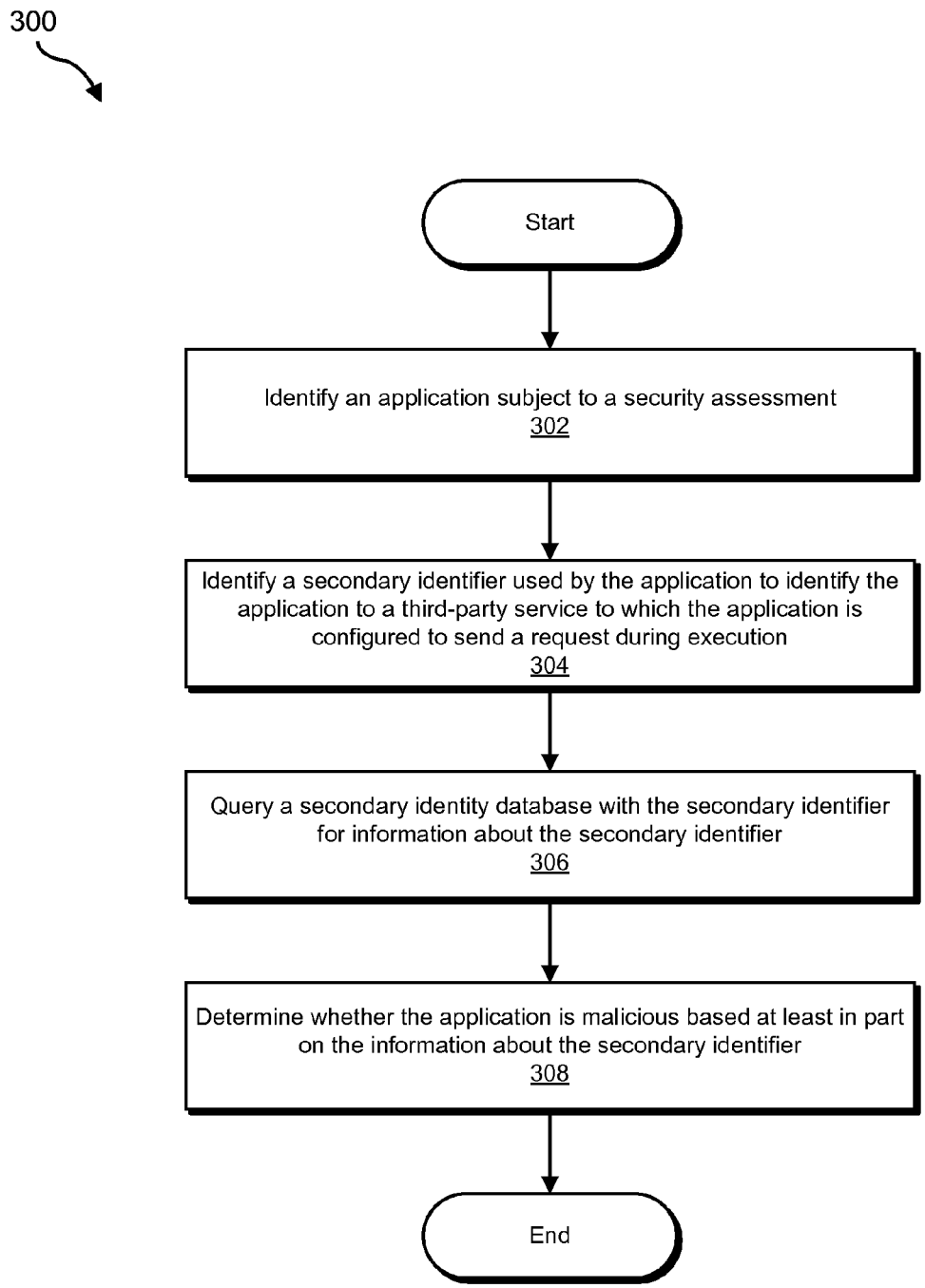
FIG. 3 is a flow diagram of an exemplary method for evaluating application trustworthiness.

FIG. 3 is a flow diagram of an exemplary computer-implemented method 300 for evaluating application trustworthiness. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify an application subject to a security assessment. For example, at step 302 identification module 104 may, as part of computing device 202 in FIG. 2, identify application 220 subject to a security assessment.

As used herein, the term "application" may refer to any application, application package, program, module, script, daemon, and/or process that may execute on a computing system. In some examples, the application may include an application (e.g., an application package) for a mobile computing platform. As used herein, the phrase "mobile computing platform" may include any of a variety of mobile devices, including a mobile phone, a tablet computer, an e-book reader, a personal digital assistant, and the like. As used herein, the phrase "application package" may refer to any file serving as a package and/or archive of one or more files (e.g., class files, resource files, asset files, manifest files, and/or certificate files) useful for distributing, installing, and/or executing an application. An example of the application package file may include an ANDROID application package file ("APK").

As used herein, the phrase "security assessment" may refer to any suitable security assessment, analysis, and/or scan. For example, the security assessment may include an authentication check, a whitelist check, a blacklist check, a malware scan, an intrusion prevention analysis, a vulnerability analysis, etc. As used herein, the term "malware" may refer to any virus, worm, Trojan horse, spyware, and/or any other malicious, illegitimate, and/or unauthorized software.

Identification module 104 may identify the application as subject to a security assessment in any of a variety of contexts. For example, identification module 104 may identify a download of the application. Additionally or alternatively, identification module 104 may identify an attempt to install the application. In some examples, identification module 104 may identify a completed installation of the application. In some examples, identification module 104 may identify an attempt to execute the application. Additionally or alternatively, identification module 104 may identify an update to the application.

Figure 4:
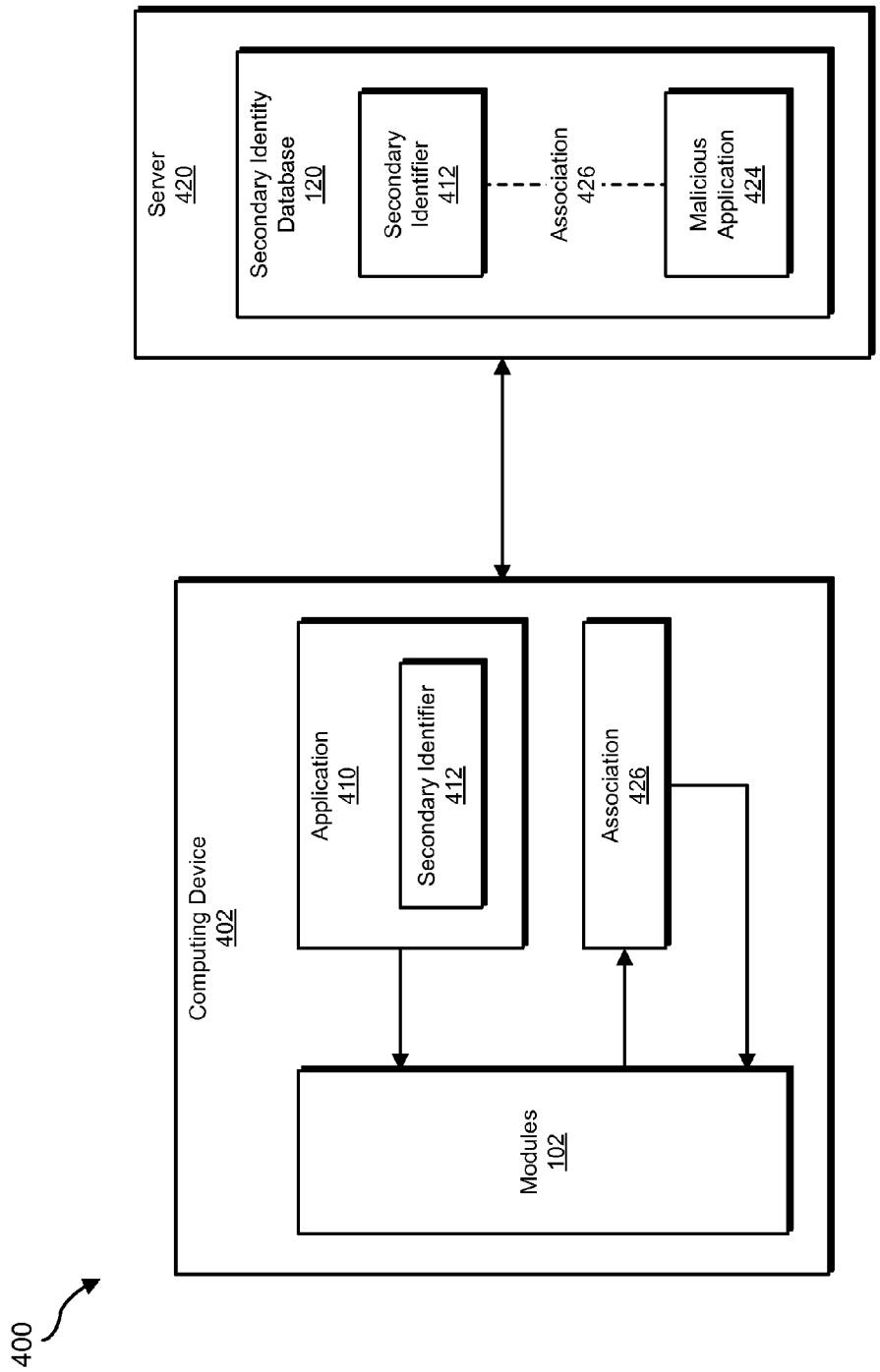
FIG. 4 is a block diagram of an exemplary system for evaluating application trustworthiness.

FIG. 4 illustrates an exemplary system 400 for evaluating application trustworthiness. As shown in FIG. 4, exemplary system 400 may include a computing device 402 in communication with a server 420. Using FIG. 4 as an example, at step 302 identification module 104 may, as a part of computing device 402, identify an application 410 as subject to a security assessment.

Figure 5:
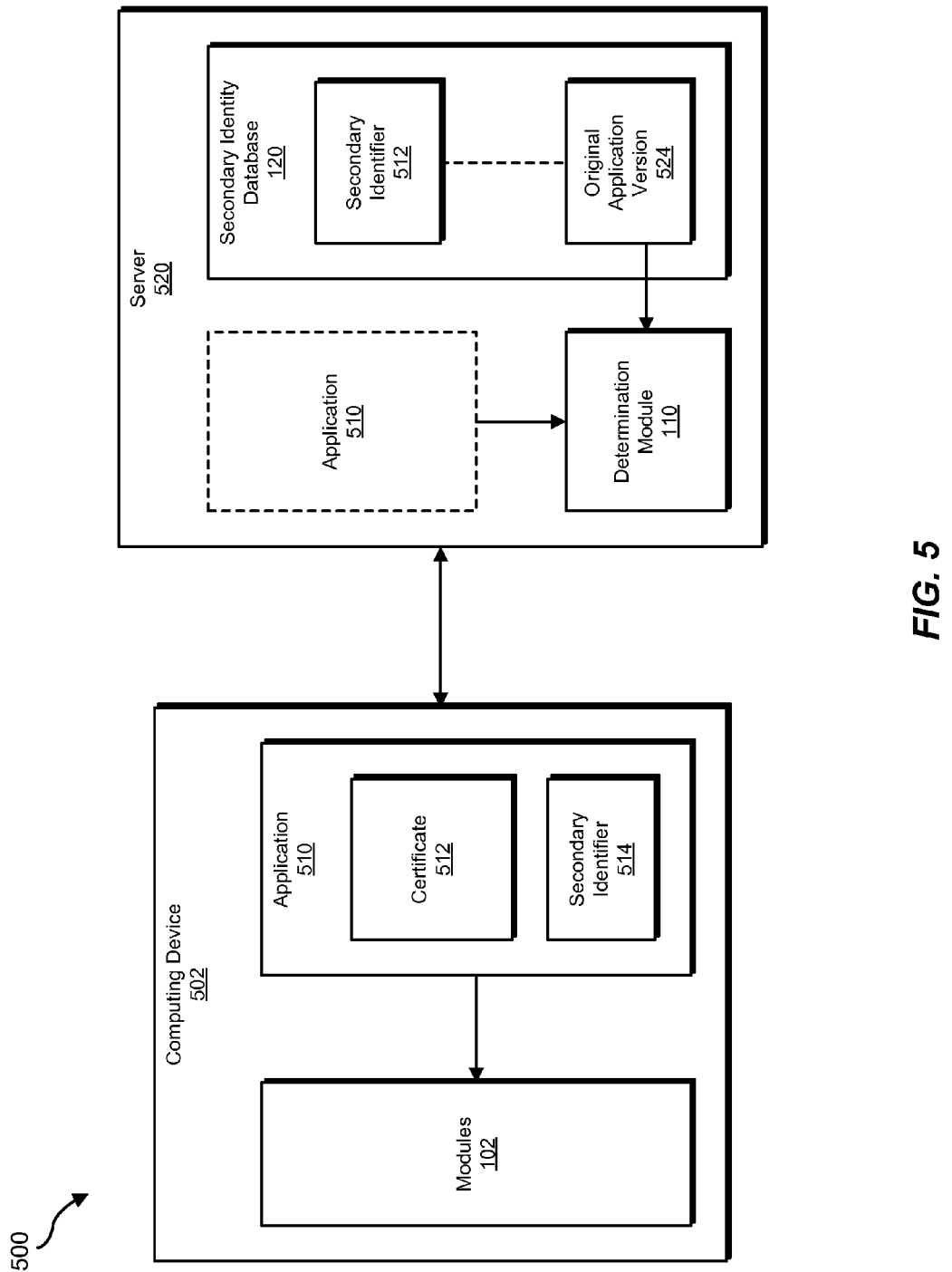
FIG. 5 is a block diagram of an exemplary system for evaluating application trustworthiness.

FIG. 5 illustrates an exemplary system 500 for evaluating application trustworthiness. As shown in FIG. 5, exemplary system 500 may include a computing device 502 in communication with a server 520. Using FIG. 5 as an example, at step 302 identification module 104 may, as a part of computing device 502, identify an application 510 as subject to a security assessment.

Returning to FIG. 3, at step 304 one or more of the systems described herein may identify a secondary identifier used by the application to identify the application to a third-party service to which the application is configured to send a request during execution. For example, at step 304 analysis module 106 may, as part of computing device 202 in FIG. 2, identify secondary identifier 222 used by application 220 to identify application 220 to third-party service 208 to which application 220 is configured to send request 224 during execution.

As used herein, the term "service" may refer to any computing resource, application, and/or system. Accordingly, the phrase "third-party service" may refer to any service that operates distinctly from (e.g., outside the domain of, awareness of, and/or system scope of) a security system that performs the security assessment. In some examples, the third-party service may be owned and/or controlled by a different entity that the security system and/or the computing device on which the application is to execute. For example, the third-party service may include an advertisement network. Additionally or alternatively, the third-party service may include an Internet-based platform and/or third-party library (e.g., such as one or more functions provided via an application programming interface ("API") for FACEBOOK, TWITTER, GOOGLE PLUS, GOOGLE ANALYTICS, ENSIGHTEN, URCHIN, OMNITURE, and the like).

As used herein, the phrase "secondary identifier" may refer to any data capable of identifying the application, the source of the application, and/or an entity that owns and/or controls the content of the application. In some examples, the phrase "secondary identifier" may refer to an identifier normally used to identify an application to one or more systems and/or services other than the computing system that installs and/or executes the application. For example, identification module 104 may have identified the application on a mobile computing device, and analysis module 106 may identify a secondary identifier within the application useful for identifying the application with a service via a remote server.

Analysis module 106 may identify any of a variety of secondary identifiers. For example, analysis module 106 may identify a publisher identifier for an advertisement network. For example, the publisher identifier may associate the application with an account on the advertisement network, facilitating deposits to the account when an advertisement is displayed via the application and/or interacted with via the application. Because the advertisement network may require a minimum balance within the account to withdraw money from the account, application developers (including, e.g., untrustworthy application developers) may use the same secondary identifier across multiple instances and/or versions of the same application and/or across differing applications (e.g., potentially with a greater consistency than a primary identifier for the application typically used for identifying the application on the computing device on which the application is installed). Accordingly, by using the publisher identifier for the advertisement network for identifying the application, the systems and methods described herein may potentially identify the application and/or an attribute of the application with improved accuracy.

As another example, analysis module 106 may identify an application identifier for a third-party library. For example, analysis module 106 may identify an application identifier that identifies the application for the use of an API for any of a variety of services (e.g., such as those provided by FACEBOOK, TWITTER, GOOGLE PLUS, GOOGLE ANALYTICS, ENSIGHTEN, URCHIN, OMNITURE, and the like).

Analysis module 106 may identify the secondary identifier in any of a variety of ways. For example, analysis module 106 may identify the secondary identifier by parsing a manifest of the application for the secondary identifier. For example, analysis module 106 may parse a manifest file stored within an application package that provides metadata describing the application. Additionally or alternatively, analysis module 106 may identify the secondary identifier by performing a static analysis of the application. As used herein, the phrase "static analysis" may refer to any process of analyzing an application without executing the application. For example, analysis module 106 may search an executable object of the application for the secondary identifier. In another example, analysis module 106 may identify the secondary identifier by intercepting a communication from the application to the third-party service. For example, the communication may be configured to identify the application to the third-party service by including the secondary identifier.

Analysis module 106 may identify the secondary identifier in any of a variety of contexts. For example, analysis module 106 may identify the secondary identifier in response to checking a digitally-signed primary identifier of the application but failing to recognize the digitally-signed primary identifier of the application as valid. For example, analysis module 106 may determine that a package name of the application does not match a digitally-signed certificate accompanying the application. Accordingly, analysis module 106 may search for the secondary identifier as an alternative method for identify the application and/or determining the trustworthiness of the application.

Using FIG. 4 as an example, at step 304 analysis module 106 may identify a secondary identifier 412 used by application 410 to identify application 410 to a third-party service. Using FIG. 5 as an example, at step 304 analysis module 106 may identify a secondary identifier 514 used by application 510 to identify application 510 to a third-party service.

Returning to FIG. 3, at step 306 one or more of the systems described herein may query a secondary identity database with the secondary identifier for information about the secondary identifier. For example, at step 306 querying module 108 may, as part of computing device 202 in FIG. 2, query secondary identity database 120 with secondary identifier 222 for information about secondary identifier 222 (e.g., secondary identifier metadata 230).

As used herein, the phrase "secondary identity database" may refer to any suitable database, data structure, data store, and/or other system of associating data items. The secondary identity database may store any of a variety of data items and associations. For example, the secondary identity database may associate one or more secondary identifiers with one or more primary application identifiers, application publisher identifiers, application family identifiers, application reputations and/or assessments, publisher reputations and/or assessments, and/or any other information suitable for determining whether an application with the secondary identifier is likely to be trustworthy.

Querying module 108 may query the secondary identity database in any suitable manner. For example, querying module 108 may send the query to a security server with access to the secondary identity database.

Using FIG. 4 as an example, at step 306 querying module 108 may query secondary identity database 120 with secondary identifier 412 (e.g., receiving an association 426 with a malicious application 424 in response). Using FIG. 5 as an example, at step 306 querying module 108 may query secondary identity database 120 with secondary identifier 512 (e.g., resulting in identifying an association between secondary identifier 512 and an original application version 524 of application 510).

Returning to FIG. 3, at step 308 one or more of the systems described herein may determine whether the application is malicious based at least in part on the information about the secondary identifier. For example, at step 308 determination module 110 may, as part of computing device 202 in FIG. 2, determine whether application 220 is malicious based at least in part on secondary identifier metadata 230 about secondary identifier 222.

Determination module 110 may determine whether the application is malicious based on any of a variety of criteria. For example, determination module 110 may determine that the application is malicious by 1) determining, based on the information about the secondary identifier, that the secondary identifier has been associated with at least one malicious application and 2) determining, at least in part based on the secondary identifier having been associated with the malicious application, that the application subject to the security assessment also is malicious. As used herein, the term "malicious" as applied to an application may refer to an application that includes malware, that contains a vulnerability, and/or is otherwise illegitimate and/or unwanted. For example, a security scan performed on the malicious application on a different computing device may have determined that the malicious application is malicious. The security scan may have also identified the secondary identifier within the malicious application, and submitted the secondary identifier to the secondary identity database in association with the malicious application and/or the determination of maliciousness.

Using FIG. 4 as an example, at step 308 determination module 110 may determine that application 410 is malicious based on association 426 (e.g., indicating that secondary identifier 412 has been used by malicious application 424).

In some examples, determining whether the application is malicious may include 1) determining that a digitally-signed certificate used as a primary identifier for the application does not match the application, 2) determining, based at least in part on the digitally-signed certificate not matching the application, that the application is a potentially repackaged application, 3) using the secondary identifier to identify an originally packaged and trusted version of the application, and 4) comparing the originally packaged and trusted version of the application with the potentially repackaged application to determine that the application is not malicious.

Using FIG. 5 as an example, at step 308 determination module 110 may determine that application 510 is not malicious. For example, having identified original application version 524 in association with the secondary identifier 512, determination module 110 may compare original application version 524 with application 510 (e.g., by comparing at least a portion of application 510 with at least a portion of original application version 524). By determining that there are no malicious differences between application 510 and original application version 524, determination module 110 may determine that application 510 is trustworthy and/or safe.

In some examples, determination module 110 may also perform a remediation action on the application in response to determining that the application is malicious. For example, determination module 110 may delete the application, quarantine the application, report the application, warn a user about the application, etc. In some examples, determination module 110 may further 1) identify an additional secondary identifier used by the application and 2) submit the additional secondary identifier to the secondary identity database as being associated with a malicious application in response to determining that the application is malicious and identifying the additional secondary identifier used by the application. By updating the secondary identity database with information about the additional secondary identifier, the systems and methods described herein may identify one or more future malicious applications that make use of the additional secondary identifier.

As explained above, by using secondary identifiers to identify applications and/or the maliciousness of applications, the systems and methods described herein may correctly evaluate applications even when primary identifiers (e.g., application package names and/or corresponding digital signatures) fail to validate the applications. Additionally, in some examples, these systems and methods may determine that an application is malicious in spite of an apparently validating primary identifier based on a suspicious secondary identifier.

Figure 6:
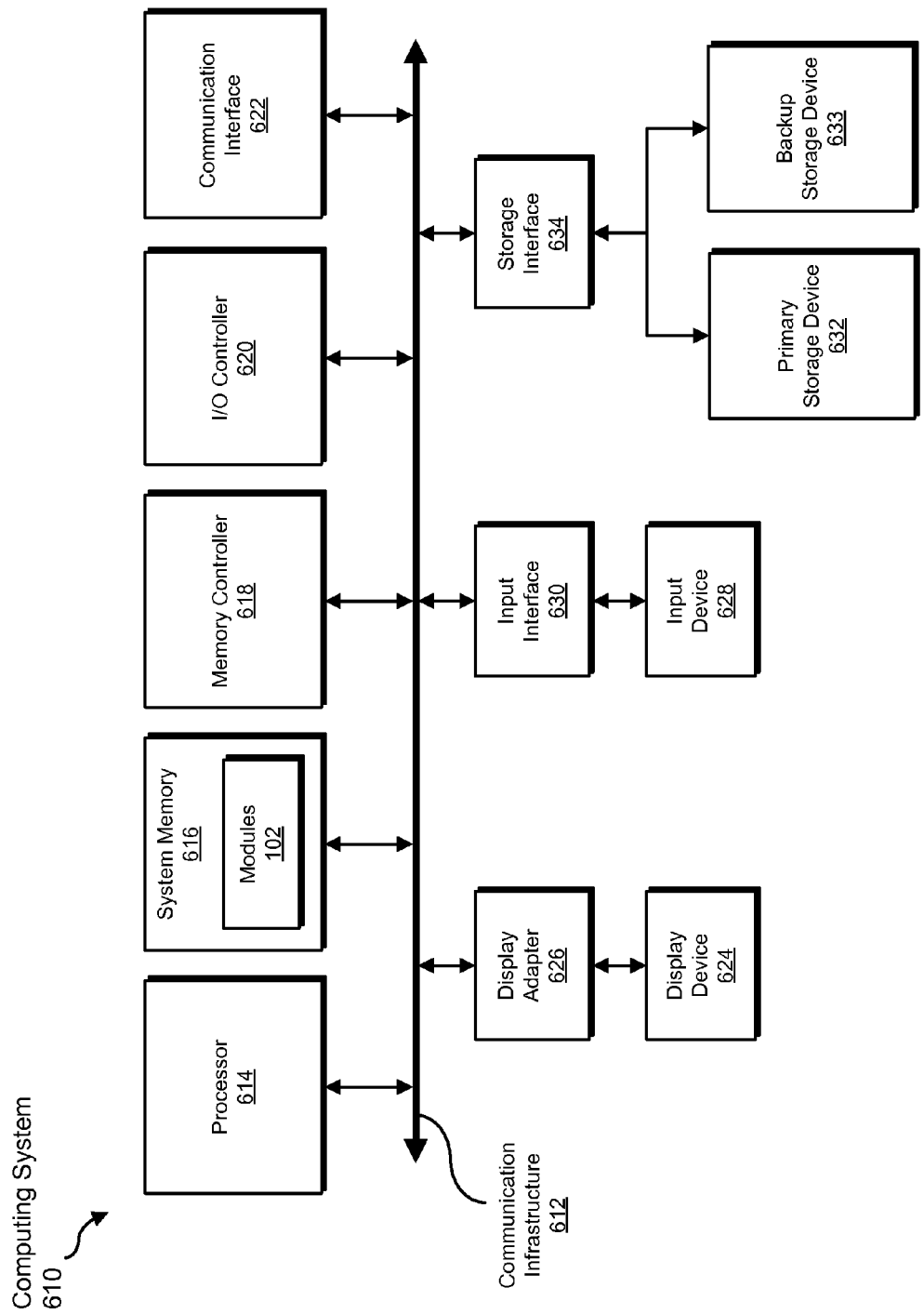
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the identifying, parsing, performing, intercepting, checking, querying, determining, using, comparing, performing, and submitting steps described herein. All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, secondary identity database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
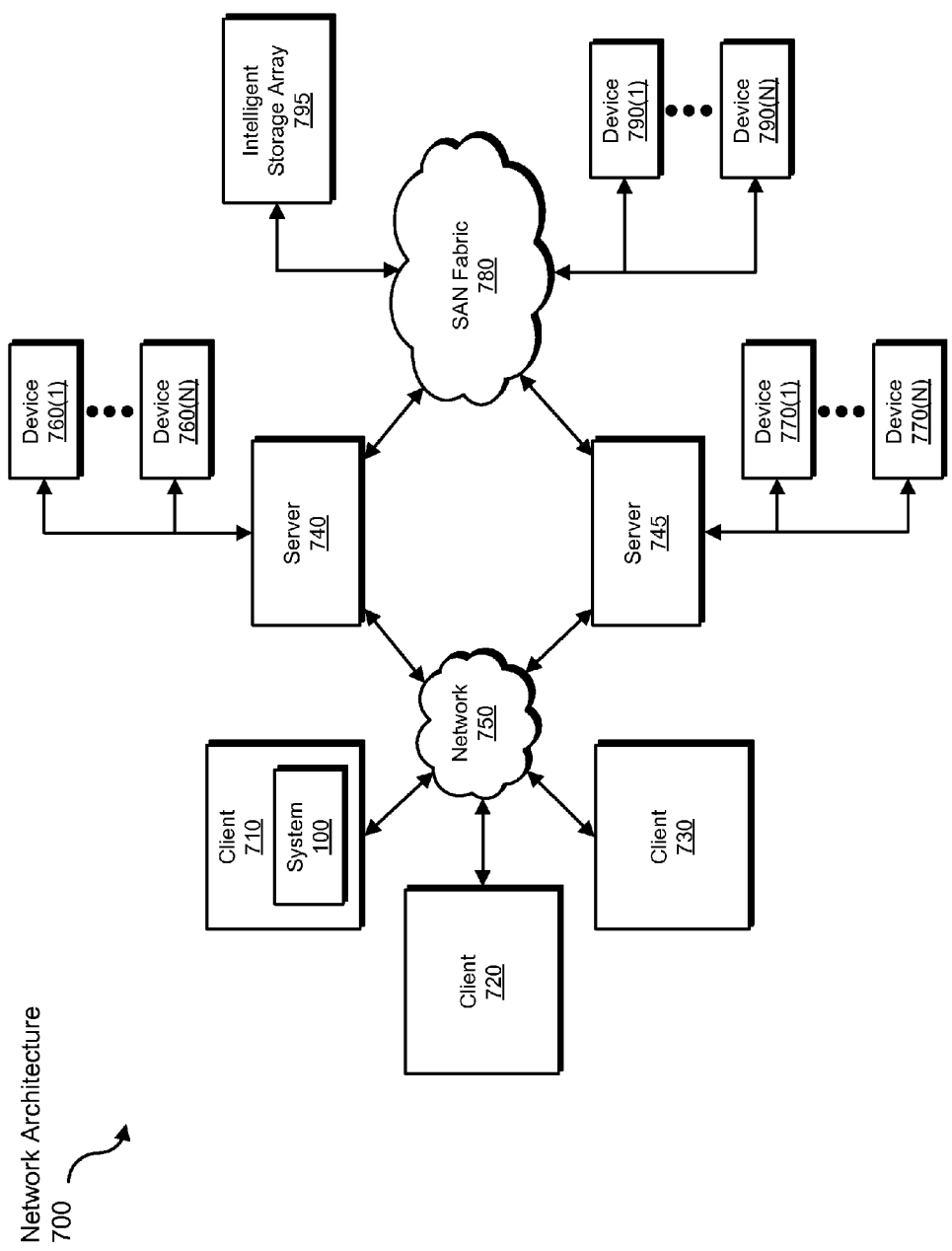
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the identifying, parsing, performing, intercepting, checking, querying, determining, using, comparing, performing, and submitting steps disclosed herein. All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for evaluating application trustworthiness.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a secondary identifier of an application transformed, transform the secondary identifier into a security assessment determination, output a result of the transformation to a user, and store the result of the transformation to a secondary identity database.

Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for evaluating application trustworthiness, at least a portion of the method being performed by a computing device comprising at least one processor, the method comprising:
   identifying an application subject to a security assessment;
   identifying a secondary identifier used by the application to validate the application to a legitimate third-party service to which the application is configured to send a request during execution;
   querying a secondary identity database with the secondary identifier for information about the secondary identifier;
   determining whether the application is malicious based at least in part on the information about the secondary identifier.

2. The computer-implemented method of claim 1, wherein determining whether the application is malicious comprises:
   determining, based on the information about the secondary identifier, that the secondary identifier has been associated with at least one malicious application;
   determining, at least in part based on the secondary identifier having been associated with the malicious application, that the application subject to the security assessment also is malicious.

3. The computer-implemented method of claim 1, wherein determining whether the application is malicious comprises:
   determining that a digitally-signed certificate used as a primary identifier for the application does not match the application;
   determining, based at least in part on the digitally-signed certificate not matching the application, that the application is a potentially repackaged application;
   using the secondary identifier to identify an originally packaged and trusted version of the application;
   comparing the originally packaged and trusted version of the application with the potentially repackaged application to determine that the application is not malicious.

4. The computer-implemented method of claim 1, wherein identifying the secondary identifier comprises at least one of:
   parsing a manifest of the application for the secondary identifier;
   performing a static analysis of the application to identify the secondary identifier;
   intercepting a communication from the application to the third-party service to identify the secondary identifier.

5. The computer-implemented method of claim 1, wherein the secondary identifier comprises at least one of:
   a publisher identifier for an advertisement network;
   an application identifier for a third-party library.

6. The computer-implemented method of claim 1, wherein identifying the secondary identifier is in response to checking a digitally-signed primary identifier of the application but failing to recognize the digitally-signed primary identifier of the application as valid.

7. The computer-implemented method of claim 1, further comprising performing a remediation action on the application in response to determining that the application is malicious.

8. The computer-implemented method of claim 7, further comprising:
   identifying an additional secondary identifier used by the application;
   submitting the additional secondary identifier to the secondary identity database as being associated with a malicious application in response to determining that the application is malicious and identifying the additional secondary identifier used by the application.

9. A system for evaluating application trustworthiness, the system comprising:
   an identification module programmed to identify an application subject to a security assessment;
   an analysis module programmed to identify a secondary identifier used by the application to validate the application to a legitimate third-party service to which the application is configured to send a request during execution;
   a querying module programmed to query a secondary identity database with the secondary identifier for information about the secondary identifier;
   a determination module programmed to determine whether the application is malicious based at least in part on the information about the secondary identifier;
   at least one processor configured to execute the identification module, the analysis module, the querying module, and the determination module.

10. The system of claim 9, wherein the determination module is programmed to determine whether the application is malicious by:
    determining, based on the information about the secondary identifier, that the secondary identifier has been associated with at least one malicious application;
    determining, at least in part based on the secondary identifier having been associated with the malicious application, that the application subject to the security assessment also is malicious.

11. The system of claim 9, wherein the determination module is programmed to determine whether the application is malicious by:
- determining that a digitally-signed certificate used as a primary identifier for the application does not match the application;
- determining, based at least in part on the digitally-signed certificate not matching the application, that the application is a potentially repackaged application;
- using the secondary identifier to identify an originally packaged and trusted version of the application;
- comparing the originally packaged and trusted version of the application with the potentially repackaged application to determine that the application is not malicious.

12. The system of claim 9, wherein the analysis module is programmed to identify the secondary identifier by at least one of:
- parsing a manifest of the application for the secondary identifier;
- performing a static analysis of the application to identify the secondary identifier;
- intercepting a communication from the application to the third-party service to identify the secondary identifier.

13. The system of claim 9, wherein the secondary identifier comprises at least one of:
- a publisher identifier for an advertisement network;
- an application identifier for a third-party library.

14. The system of claim 9, wherein the analysis module is programmed to identify the secondary identifier in response to checking a digitally-signed primary identifier of the application but failing to recognize the digitally-signed primary identifier of the application as valid.

15. The system of claim 9, wherein the determination module is further programmed to perform a remediation action on the application in response to determining that the application is malicious.

16. The system of claim 15, wherein the determination module is further programmed to:
- identify an additional secondary identifier used by the application;
- submit the additional secondary identifier to the secondary identity database as being associated with a malicious application in response to determining that the application is malicious and identifying the additional secondary identifier used by the application.

17. A non-transitory computer-readable medium comprising one or more computer-executable instructions that, when executed by at least one processor of a computing device, cause the computing device to:
- identify an application subject to a security assessment;
- identify a secondary identifier used by the application to validate the application to a legitimate third-party service to which the application is configured to send a request during execution;
- query a secondary identity database with the secondary identifier for information about the secondary identifier;
- determine whether the application is malicious based at least in part on the information about the secondary identifier.

18. The non-transitory computer-readable medium of claim 17, wherein the one or more computer-executable instructions cause the computing device to determine whether the application is malicious by causing the computing device to:
- determine, based on the information about the secondary identifier, that the secondary identifier has been associated with at least one malicious application;
- determine, at least in part based on the secondary identifier having been associated with the malicious application, that the application subject to the security assessment also is malicious.

19. The non-transitory computer-readable medium of claim 17, wherein the one or more computer-executable instructions cause the computing device to determine whether the application is malicious by causing the computing device to:
- determine that a digitally-signed certificate used as a primary identifier for the application does not match the application;
- determine, based at least in part on the digitally-signed certificate not matching the application, that the application is a potentially repackaged application;
- use the secondary identifier to identify an originally packaged and trusted version of the application;
- compare the originally packaged and trusted version of the application with the potentially repackaged application to determine that the application is not malicious.

20. The non-transitory computer-readable medium of claim 17, wherein the one or more computer-executable instructions cause the computing device to identify the secondary identifier by causing the computing device to at least one of:
- parse a manifest of the application for the secondary identifier;
- perform a static analysis of the application to identify the secondary identifier;
- intercept a communication from the application to the third-party service to identify the secondary identifier.

* * * * *